US011166229B2

(12) United States Patent
Sundberg et al.

(10) Patent No.: US 11,166,229 B2
(45) Date of Patent: Nov. 2, 2021

(54) METHODS AND NODES FOR CELL SELECTION IN A WIRELESS COMMUNICATION NETWORK

(71) Applicant: TELEFONAKTIEBOLAGET LM ERICSSON (PUBL), Stockholm (SE)

(72) Inventors: Mårten Sundberg, Årsta (SE); Olof Liberg, Stockholm (SE); Martin Van Der Zee, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 248 days.

(21) Appl. No.: 16/338,143

(22) PCT Filed: Sep. 25, 2017

(86) PCT No.: PCT/IB2017/055811
§ 371 (c)(1),
(2) Date: Mar. 29, 2019

(87) PCT Pub. No.: WO2018/060832
PCT Pub. Date: Apr. 5, 2018

(65) Prior Publication Data
US 2020/0037238 A1    Jan. 30, 2020

Related U.S. Application Data

(60) Provisional application No. 62/402,065, filed on Sep. 30, 2016.

(51) Int. Cl.
*H04W 48/20* (2009.01)
*H04W 8/24* (2009.01)
(Continued)

(52) U.S. Cl.
CPC ........... *H04W 48/20* (2013.01); *H04W 8/245* (2013.01); *H04W 48/02* (2013.01); *H04W 52/36* (2013.01)

(58) Field of Classification Search
CPC ..... H04W 48/20; H04W 8/245; H04W 48/02; H04W 52/36; H04W 4/70; H04W 48/17; H04W 52/346
See application file for complete search history.

(56) References Cited

U.S. PATENT DOCUMENTS 9,155,036 B1    10/2015 Singh et al.
9,432,902 B2    8/2016 Froberg Olsson et al.
(Continued)

FOREIGN PATENT DOCUMENTS

CN    104080118 A    10/2014
CN    104980984 A    10/2015
(Continued)

OTHER PUBLICATIONS

3GPP TSG RAN WG1 Meeting #86: "Low power UE support for eNB-IoT"; Aug. 22-26, 2016; 3 pages.
(Continued)

*Primary Examiner* — Benjamin H Elliott, IV
(74) *Attorney, Agent, or Firm* — Ericsson Inc.

(57) ABSTRACT

A method for selecting a cell by a wireless device in a wireless communication network is disclosed. The method comprises: receiving a signal from a cell associated with a network node; determining whether the signal from the cell satisfies a cell selection criterion, wherein the cell selection criterion is based at least in part on a parameter that controls a compensation to the cell selection criterion, the compensation being associated with a power class of the wireless device; and selecting the cell in response to a determination that the signal from the cell satisfies the cell selection criterion. A wireless device for carrying out this method is also disclosed.

20 Claims, 11 Drawing Sheets

(51) Int. Cl.
*H04W 48/02* (2009.01)
*H04W 52/36* (2009.01)

(56) References Cited

U.S. PATENT DOCUMENTS

| | | | |
|---|---|---|---|
| 2008/0090575 A1* | 4/2008 | Barak | H04W 28/18 455/444 |
| 2016/0088568 A1 | 3/2016 | Webb et al. | |
| 2017/0257874 A1* | 9/2017 | Ma | H04W 72/0473 |
| 2019/0124604 A1* | 4/2019 | Takahashi | H04W 48/20 |
| 2019/0173533 A1* | 6/2019 | Kim | H04B 7/0408 |
| 2019/0261259 A1* | 8/2019 | Kim | H04W 48/20 |
| 2020/0037238 A1* | 1/2020 | Sundberg | H04W 48/20 |
| 2020/0252884 A1* | 8/2020 | Takahashi | H04W 52/36 |

FOREIGN PATENT DOCUMENTS

| | | |
|---|---|---|
| CN | 105474713 A | 4/2016 |
| EP | 3209068 A1 | 8/2017 |
| RU | 2219661 C2 | 12/2003 |
| RU | 2526736 C2 | 8/2014 |
| RU | 2565030 C2 | 10/2015 |
| WO | 2014/085097 A1 | 6/2014 |
| WO | 2015/171254 A1 | 11/2015 |
| WO | 2016/114149 A1 | 3/2016 |
| WO | 2016/070387 A1 | 5/2016 |

OTHER PUBLICATIONS

3GPP TSG-RAN2 Meeting #95: "Further reduced power class in NB-IoT"; Aug. 22-26, 2016; 9 pages.
3GPP TSG RAN WG2 #91: "Cell Selection/Reselection for Rel-13 low complexity MTC"; Aug. 24-28, 2015; 3 pages.
3GPP TSG-RAN2 Meeting #95bis, R2-166566: "Further reduced power class in NB-IoT"; Kaohslung, Taiwan, Oct. 10-14, 2016; 13 pages.
3GPP TSG RAN WG2 Meeting #95, R2-164861: "Consideration on new UE power class"; Gothenburg, Sweden, Aug. 22-26, 2016; 8 pages.

* cited by examiner

METHODS AND NODES FOR CELL SELECTION IN A WIRELESS COMMUNICATION NETWORK

CROSS-REFERENCE TO RELATED APPLICATIONS

This non-provisional patent application claims priority based upon the prior U.S. provisional patent application entitled "Network capacity dependent cell suitability criterion", application No. 62/402,065, filed Sep. 30, 2016, in the names of Mårten Sundberg, Olof Liberg and Martin van der Zee, the entire contents of which are incorporated herein by reference.

FIELD

Certain embodiments of the present disclosure relate, in general, to wireless communications and, more particularly, to network capacity dependent cell suitability criterion.

BACKGROUND

In cellular technologies, an important aspect is to have the devices in the system connected to a suitable cell. In case the cell is not suitable, the device would cause higher interference levels than otherwise necessary, and the network could experience severe problems, such as near-far complications. It is hence important for the device to select a suitable cell for mobility.

The cell selection criterion determines if the cell is suitable to camp on, and puts a minimum requirement on whether the user equipment (UE) is allowed to select the cell. In addition, the UE is required to continuously re-select the best (e.g., strongest) cell. As an example, the best (e.g., strongest) cell typically changes when the UE is moving. Thus, when another cell becomes "better," the UE performs cell reselection. In case the best cell is not suitable, the UE is not allowed to re-select to it.

The cell selection and cell reselection are performed by the wireless device autonomously based on pre-defined rules, one or more pre-defined parameters and one or more network configured parameters (e.g., signal hysteresis, time hysteresis, etc.). Cell reselection can be performed both in idle mode or when the device is connected to the network (which may be referred to as connected mode or active mode). The cell selection and reselection procedures are more generally part of UE mobility procedures.

The cell selection and cell reselection need to be based on one or more signal measurement related criteria, such as:
Total received signal level estimate (also referred to as received signal strength indication ("RS SI"));
Wanted signal level estimate;
Quality based estimate (i.e., quality in terms of equalizer statistics of some sort);
Carrier-to-Interference ratio (C/I), received signal/RSSI, signal-to-noise ratio (SNR), or signal-to-interference-plus-noise ratio (SINR) estimate.

Also, other factors, such as output power level of the device, is typically taken into account in order to ensure that both the uplink (UL) and downlink (DL) work. For example, there is no reason to allow access to a cell if the device can synchronize to the cell and acquire information on the DL, but when the device transmits in the UL, there is no way for the network to "hear" it.

Another aspect of cellular technologies is coverage extension. Third Generation Partnership Project (3GPP) Release 13 introduced a new radio access technology denoted Narrowband Internet of Things (NB-IoT) intended to provide machine-to-machine type connectivity. In the same release, LTE enhancements intended for machine-type communications (MTC) including a bandwidth-reduced low-complexity (BL) UE type was specified (UE Category M1). Also, for Global System for Mobile communication (GSM), a new solution named Extended Coverage GSM Internet of Things (EC-GSM-IoT) was specified with the purpose to serve Internet of Things (IoT) types of traffic.

Common to these three solutions is that they were designed to cater for services characterized by requirements on extended radio coverage range, long battery life, low complexity as well as short data transfers. The main technology used by all three solutions to facilitate extended coverage is repetition based transmission schemes, also commonly referred to as blind repetitions in the EC-GSM-IoT 3GPP specifications, or just repetitions in the NB-IoT 3GPP specifications.

SUMMARY

To combat the above-mentioned potential problem with unevenly distributed resource usage amongst devices using different output power classes in the same system, certain embodiments of the present disclosure re-define the cell suitability criterion to get a non-linear dependency of the cell suitability criterion and the maximum output power capability of the UE.

Certain embodiments of the present disclosure may provide one or more technical advantages. For example, certain embodiments may provide a more energy efficient operation for devices using sensing to access a radio resources where the service/traffic requirement of one user (for example a short scheduling period is required) can have significant effect to other UEs allocated the same resources, but that has more loose service/traffic requirements. Certain embodiments may have all, some, or none of these advantages. Other advantages will be apparent to persons of ordinary skill in the art.

According to a first aspect, there is provided a method for selecting a cell by a wireless device in a wireless communication network. The method comprises: receiving a signal from a cell associated with a network node; determining whether the signal from the cell satisfies a cell selection criterion, wherein the cell selection criterion is based at least in part on a parameter that controls a compensation to the cell selection criterion, the compensation being associated with a power class of the wireless device; and selecting the cell in response to a determination that the signal from the cell satisfies the cell selection criterion.

According to a second aspect, there is provided a wireless device for selecting a cell in a wireless communication network. The wireless device comprises: a processor and a memory connected thereto, wherein the memory comprises instructions that, when executed, cause the processor to: receive a signal from a cell associated with a network node; determine whether the signal from the cell satisfies a cell selection criterion, wherein the cell selection criterion is based at least in part on a parameter that controls a compensation to the cell selection criterion, the compensation being associated with a power class of the wireless device; and select the cell in response to a determination that the signal from the cell satisfies the cell selection criterion.

According to a third aspect, there is provided a method for controlling cell access in a wireless communication network. The method comprises: determining a parameter that controls a compensation to a cell selection criterion, the compensation being associated with a power class of a wireless device; and transmitting a signal to a cell with which the network node is associated, the signal comprising the determined parameter.

According to a fourth aspect, there is provided a network node for controlling cell access in a wireless communication network. The network node comprises: a processor and a memory connected thereto, the memory comprising instructions that, when executed, cause the processor to: determine a parameter that controls a compensation to a cell selection criterion, the compensation being associated with a power class of a wireless device; and transmit a signal to a cell with which the network node is associated, the signal comprising the determined parameter.

The foregoing and other aspects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Certain problems can be envisioned with respect to the Internet of Things networks that have previously been proposed. For example, it is expected that the number of IoT devices will grow exponentially over the years to come. The IoT devices usually belong to the ultra-low end segment of IoT with very low average revenue per user (ARPU). So, the power is in numbers for the operator that need to make a profit out of deploying the devices. However, the more devices that are present in the network the more capacity will be taken, which could negatively impact the more high-end users. Adding on top of this that the ultra-low end devices are often placed in remote locations that the radio signal has difficulty reaching, the above-mentioned repetitions are required to establish network communication, and by this even more capacity is taken. Even in a network where only low-end IoT devices are expected to operate, e.g., NB-IoT, in which case there is no competition for the resources with more high-end devices, users that are in more challenging coverage conditions will take up a disproportionate amount of resources, which might quickly drain capacity.

Figure 1:
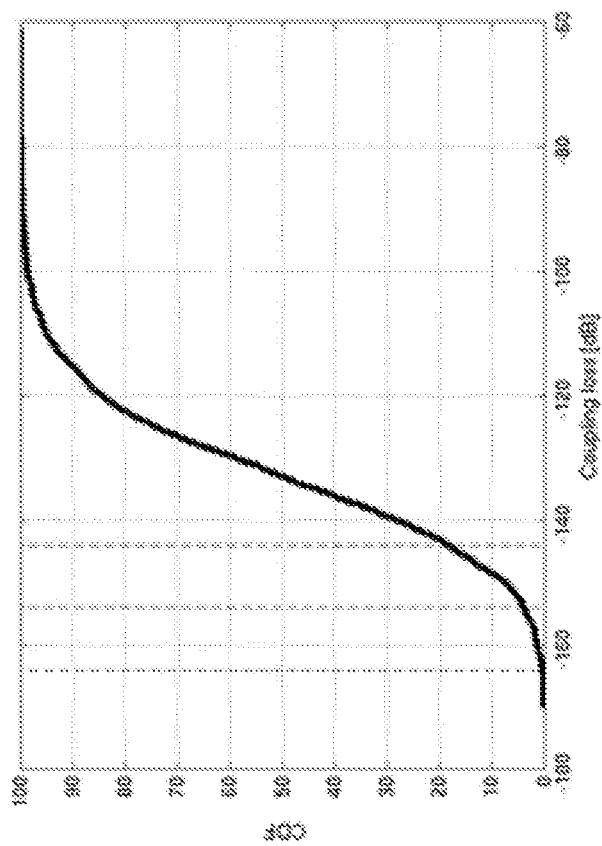
FIG. 1 is a graph illustrating a network distribution of coupling loss for IoT.

FIG. 1 provides an example of a network distribution of coupling loss for IoT, which can be used as a 3GPP model of an IoT network. The term coupling loss (CL) on the x-axis can be considered as a measurement of coverage, and the higher the CL, the worse coverage the device is in. All above-mentioned systems have been developed to reach 20 dB better coverage than GSM, which have been agreed by 3GPP can be considered to be at 144 dB CL. Hence, a 20 dB improvement would mean being able to operate at 164 dB CL. In FIG. 1, CL 164 dB, 154 dB, and 144 dB are shown using dashed black line.

Assume further that a certain number of repetitions are needed to reach the device if placed at CL 144-154 dB, a second number of blind repetitions are needed at CL 154-164 dB. For the region of 154-164 dB for example, each user need to use blind repetitions dimensioned for the 164 dB CL case, i.e., several of the users will use more resources than required. This may seem like a suboptimal system implementation but should be seen as a trade-off between implementation complexity and resource usage. Exactly this approach has also been taken for the NB-IoT Random Access procedure where a UE is required to select one out of three, by the NW supported, repetition levels based on its estimated coupling loss (see TS 36.213). An alternative would be for the system to support any number of blind repetitions, in which case complexity is increased but resource usage is decreased.

Assume, for users between 154-164 dB CL, that 100 repetitions are needed (10*log 10(100)=20 dB) and that for the region 144-154 dB CL, 10 repetitions are needed (10*log 10(10)=10 dB).

The ratio of users in each coverage bin can be roughly read from the Cumulative Distribution Function (CDF) (see FIG. 1):

164-154 dB: 4% of all UEs require 100 repetitions;
154-144 dB: 14% of all UEs require 10 repetitions;
≤144 dB: 82% of all UEs require no repetitions.

Hence, users in extended coverage compared to GSM (>144 dB) takes up roughly 87% ((0.04*100+0.14*10)/(0.04*100+0.14*10+0.82*1)) of the network resources.

This is not a balanced network in terms of resource usage, and it gets even worse if allowing UEs of a lower output power class to access the network. A lower output power class is already supported by the EC-GSM-IoT specifications (see 3GPP TS 45.005 V13.1.0), and is being discussed for NB-IoT in the scope of ongoing 3GPP Release 14 work (see RP-161901). If adopting the same specification in terms of allowed number of repetitions as the higher output power classes (which is typically what is assumed for the above-mentioned technologies) more users will end up out-of-coverage, and more users using repetitions.

For example, in case a new NB-IoT low power UE is introduced that supports roughly 10 dB lower output power than what currently is the case, this will force UEs in the CL range above 154 dB out of coverage, and increase the number of repetitions required by the UEs in coverage approximately as follows:

164-154 dB: 4% of all UEs goes out-of-coverage;
154-144 dB: 14% of all UEs require 100 blind repetitions;
144-134 dB: 30% of all UEs require 10 blind repetitions;
<134 dB: 52% of all UEs require no blind repetitions.

In this case, users using blind repetitions takes up roughly 97% of the network resources.

Figure 2:
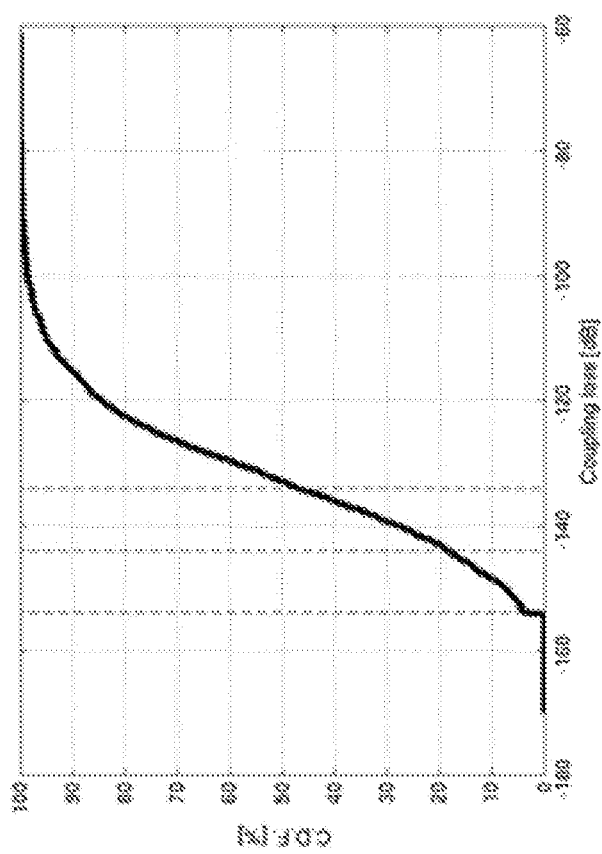
FIG. 2 is a graph illustrating a network distribution of coupling loss for IoT with 10 dB lower output power.

FIG. 2 illustrates this case, with a network distribution of coupling loss for IoT with 10 dB lower output power.

To combat the above-mentioned potential problem with unevenly distributed resource usage amongst devices using different output power classes in the same system, certain embodiments of the present disclosure re-define the cell suitability criterion to get a non-linear dependency of the cell suitability criterion and the maximum output power capability of the UE.

It should be noted that the terms "cell suitability criterion" and "cell selection criterion" refer to the same thing and could be used interchangeably. The cell suitability criterion means that the criterion used to determine if a cell is suitable for a user to use. For example, if a cell meets the cell suitability criterion, then the cell is suitable for a user device to select it and access it.

Usually a linear dependency is already in place in the cell suitability criterion where, for example, a UE needs to experience a 10 dB stronger downlink signal level in order to access the cell, compared to a UE with a 10 dB higher output power level. The low power UE needs to select a cell based on its weakest link, which is the uplink. For the majority of UEs (e.g. UEs within the power class of 23 dBm), the UL/DL are assumed to be balanced. However, this is to take into account the above-mentioned balancing of the UL and DL, and has no relation to the capacity issue.

In a general way, the non-linear component to the cell suitability criterion can be implemented by a power class specific shift.

$$\text{Cell suitability criterion} = C + P_{shift} \quad [1]$$

Where C is the current cell suitability criterion, and $P_{shift}$ is the power class specific shift of the suitability criterion.

For a cell to be suitable, both Srxlev and Squal have to be greater than zero in NB-IoT. In other words, the cell selection criterion S (or equivalently C) is fulfilled when (see 3GPP TS 36.304 V13.2.0, section 5.2.3.2a):

Srxlev>0 AND Squal>0 where: Srxlev=$Q_{rxlevmeas}$-$Q_{rxlevmin}$Pcompensation-$Q$offset$_{temp}$

Squal=$Q_{qualmeas}$-$Q_{qualmin}$-$Q$offset$_{temp}$ with

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) If UE is not authorized for enhanced coverage and Qoffset$_{authorization}$ is valid then $Q_{rxlevmin}$ = $Q_{rxlevmin}$ + Qoffset$_{authorization}$. |
| $Q_{qualmin}$ | Minimum required quality level in the cell (dB) |

If the UE supports the multiNS-Pmax-r13 and an additionalPmax is broadcasted in SIB1-NB, SIB3-NB or SIB5-NB, then the UE uses this additionalPmax instead of the P-max of the cell:

Pcompensation=max(P-max-P$_{powerClass}$,0)-(min(additionalPmax,P$_{powerClass}$)-min (P-max,P$_{powerClass}$))

else:Pcompensation=max(P-max-P$_{PowerClass}$,0)

wherein P-max is the maximum uplink transmission power in the cell and P$_{powerclass}$ is the maximum output power according to the UE power class (see 3GPP TS 36.101). P-max can be can also correspond to the maximum Radio Frequency (RF) output power of the wireless device.

It should be noted that compared to the notation in 3GPP TS 36.304 V13.2.0, section 5.2.3.2a, P-max is equivalent to P$_{EMAX1}$ and additionalPmax is equivalent to P$_{EMAX2}$.

It should be understood that the Pcompensation factor is a fixed value for all UEs within the same power class. Indeed, the Pcompensation factor is used to compensate or take into account the power class of the UE. For example, IoT devices are part of the low power class of UEs.

This compensation factor can be written as (as shown above):

$$\text{Pcompensation}=\max(\text{P-max}-P_{PowerClass},0) \quad [2]$$

As shown in Equation 2, the Pcompensation factor punishes UEs of a low power class with the difference to the P-max of the cell. For example, when P-max is set to 23 dBm, then a 14 dBm UE has a −9 dB penalty as given by the Pcompensation factor of equation 2.

However, it would be beneficial if this penalty/compensation can be more flexible (and thus configurable) such that it can "promote" or "demote" the cell suitability for UEs within a low power class. For example, by having more control over the compensation, the network is able to deny certain devices of a low power class to access the system/cell at a coupling loss where the devices need to use repetitions. As such, a network node or base station will have control over the trade-off between the coverage enhancements a low power UE can enjoy and the amount of network resources these coverage enhancements require.

More specifically, in an embodiment, the control over the compensation can be implemented as a non-linear component. As an exemplary embodiment, the control can be implemented by a configurable parameter, referred to as a Low Power Class (LPC) offset, within the Pcompensation factor of equation 2 of the cell suitability criterion. For example, the LPC offset can be incorporated in the Pcompensation equation, as indicated by the bold parameter LPC-offset in the equation below.

$$\text{Pcompensation}=\max(\text{P-max}-(P_{PowerClass}-\textbf{LPC-Offset}),0) \quad [3]$$

This parameter (e.g. the offset parameter) allows to control the compensation associated with the power class of the UE, provided by the Pcompensation factor. As such, it allows more flexibility for the network to determine when to allow certain low power class UEs to camp on the cell (and thus to access the cell, and consume network resources). In a broad sense, this parameter allows to control the adjustment associated with the power class of the UE. For example, this offset parameter, provided by the parameter LPC-Offset, allows both positive and negative offset, i.e. enabling the low power class UE to consume more or less network resources. As such, the LPC-Offset offset controls the compensation for lower power class UEs by varying and configuring the offset parameter to have different exemplary values as shown below:

LPC-Offset::-ENUMERATED {dB−6, dB−3, dB0, dB3, dB6, dB10, dB15, dB20}OPTIONAL

This configurable and variable parameter can be transmitted to the UEs in a system information block, such as SIB1-NB, SIB3-NB and SIB5-NB. It should be noted that, when the low power class offset is omitted in SIB1-NB, the default value of "0 dB" shall be used. This power class correction is not needed when the UE supports additionalP-max, i.e. when the UE supports a power class higher than the allowed P-max in the cell.

In another embodiment, the power compensation is replaced by a more generic function dependent on the maximum allowed UE power, P-max, and the output power capability of a UE attempting to evaluate suitability of a cell:

$$Pcompensation = F(P\text{-}max - P_{PowerClass}) \quad [4]$$

As such the parameter that controls the compensation to the cell selection criterion is given by the generic function F.

In a simpler form, the function applies a compensation linearly increasing with the difference between P-max and the UE power class:

$$Pcompensation = \alpha \cdot (P\text{-}max - P_{PowerClass}) \quad [5]$$

In equation [5], the alpha ($\alpha$) parameter can be defined to penalize certain UEs supporting a low power class, in order to minimize their impact on the system capacity.

In another embodiment, the alpha parameter is made dependent on the power class of the device, such as:

$$Pcompensation = \alpha(P_{PowerClass}) \cdot (P\text{-}max - P_{PowerClass}) \quad [6]$$

This increases the flexibility to define a generic cell suitability criterion that could e.g., be designed to not allow devices of low power classes to access the system at a coupling loss where they need to use repetitions.

The alpha parameter may be signaled by the network by System Information Blocks (SIBs) or RRC signaling.

Embodiments of the present disclosure may be implemented in any suitable network, such as the wireless network 100 illustrated in FIG. 3 below.

Wireless network 100 includes wireless devices 110a-110b (which may be referred to interchangeably as user equipments, UEs) and a plurality of radio access nodes or network nodes 120a-120b (e.g., enhanced Node Bs (eNBs), gNBs, etc.) connected to one or more core network nodes 130 via an interconnecting network 125. Wireless devices 110 within coverage area 115 may each be capable of communicating directly with radio access nodes 120 over a wireless interface. In certain embodiments, wireless devices may also be capable of communicating with each other via device-to-device (D2D) communication. In certain embodiments, radio access nodes 120a-120b may also be capable of communicating with each other via various interfaces/protocols (e.g. X2 in LTE, or other similar interface/protocol).

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell.

In some embodiments wireless device 110 may be interchangeably referred to by the non-limiting term user equipment (UE). Wireless device 110 can be any type of wireless device capable of communicating with network node or another UE over radio signals. The UE may also be radio communication device, target device, device to device (D2D) UE, machine type UE or UE capable of machine-to-machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. An example embodiment of wireless device 110 is described in more detail below with respect to FIG. 4.

In some embodiments, generic terminology "network node" is used. It can be any kind of network node which may comprise of a radio network node such as radio access node 120 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., mobile management entity, MME, self-organizing network node, SON node, a coordinating node, positioning node, minimization of drive test node, MDT node, etc.), or even an external node (e.g., 3rd party node, a node external to the current network), etc. The network node may also comprise test equipment. The term "radio node" may be used to denote a UE (e.g., wireless device 110) or a radio network node (e.g., radio access node 120). An example embodiment of radio access node 120 is described in more detail below with respect to FIG. 5.

In certain embodiments, radio access nodes or network nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Examples of core network node 130 may include mobile switching center (MSC), MME, serving gateway (SGW), packet data network gateway (PGW), operation and maintenance (O&M), operations support system (OSS), SON, positioning node (e.g. Enhanced Serving Mobile Location Center, E-SMLC), MDT node, etc. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Figure 3:
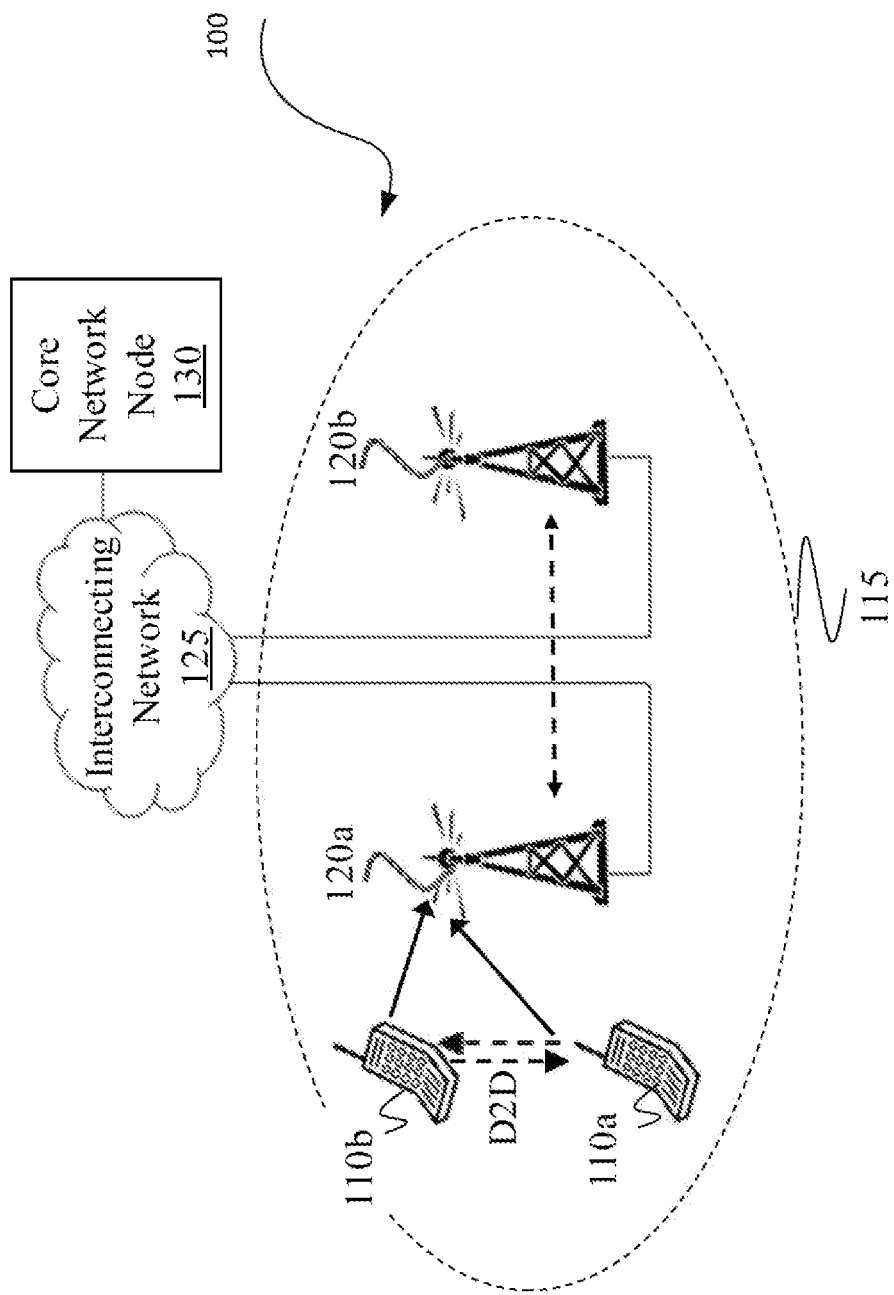
FIG. 3 illustrates a schematic diagram of a wireless communication network.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments are applicable to any RAT, such as Universal Mobile Telecommunications System Terrestrial Radio Access Network (UTRA), enhanced UTRA (E-UTRA), narrow band internet of things (NB-IoT), WiFi, Bluetooth, next generation RAT (NR, NX), 4G, 5G, LTE FDD/TDD, Wideband Code Division Multiple Access (WCDMA), High Speed Packet Access (HSPA), Global System for Mobile Communication (GSM), GSM Edge Radio Access Network (GERAN), WLAN, CDMA2000, etc.

Figure 4:
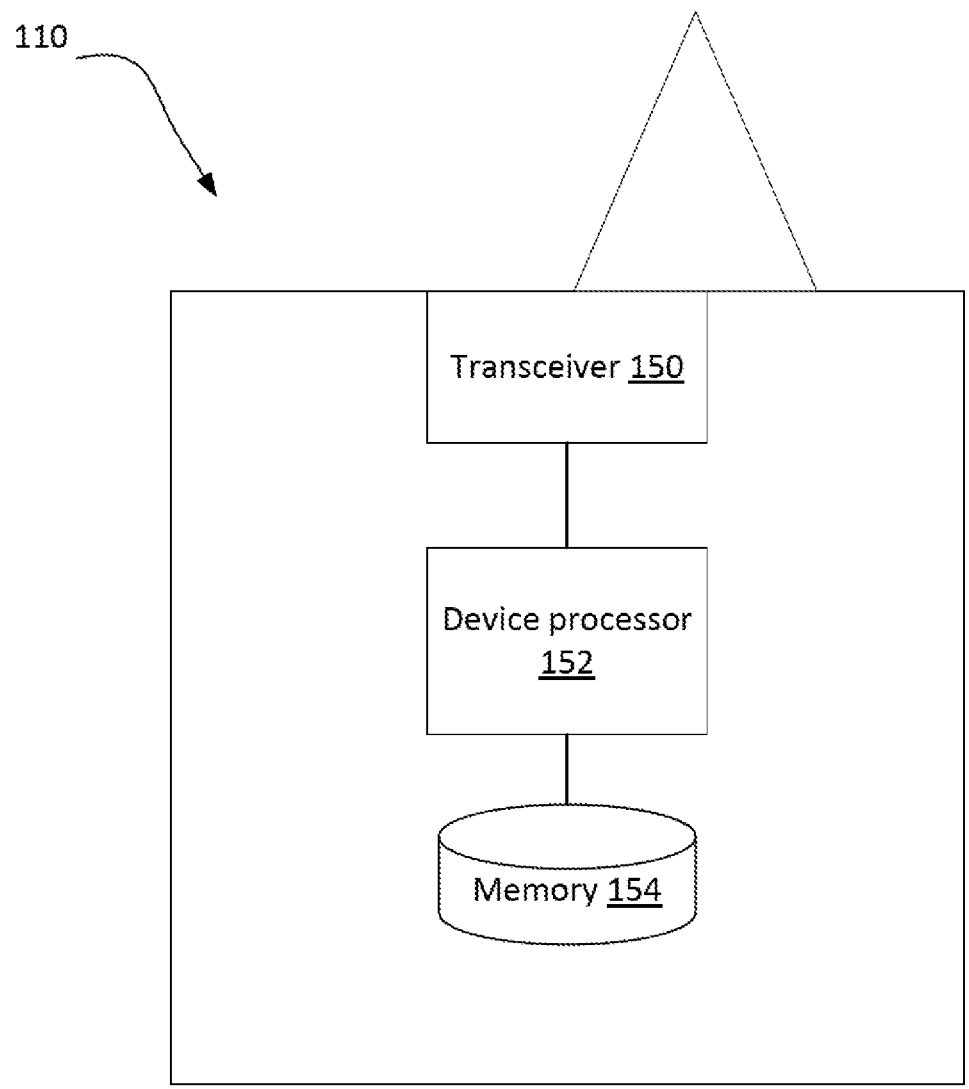
FIG. 4 illustrates a schematic diagram of a wireless device according to an embodiment.

FIG. 4 is a block diagram of an exemplary wireless device 110, in accordance with certain embodiments.

Wireless device 110 includes a transceiver 150, processor 152, and memory 154. In some embodiments, the transceiver 150 facilitates transmitting wireless signals to and receiving wireless signals from radio access node 120 (e.g., via an antenna), the processor 152 executes instructions to provide some or all of the functionality described above as being provided by wireless device 110, and the memory 154 stores the instructions for execution by the processor.

The processor may include any suitable combination of hardware and software implemented in one or more modules to execute instructions and manipulate data to perform some or all of the described functions of wireless device 110, such as the functions of wireless device 110 described above. In some embodiments, the processor may include, for example, one or more computers, one or more central processing units (CPUs), one or more microprocessors, one or more applications, one or more application specific integrated circuits (ASICs), one or more field programmable gate arrays (FPGAs) and/or other logic.

The memory 154 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of wireless device 110.

Other embodiments of wireless device 110 may include additional components beyond those shown in FIG. 4 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
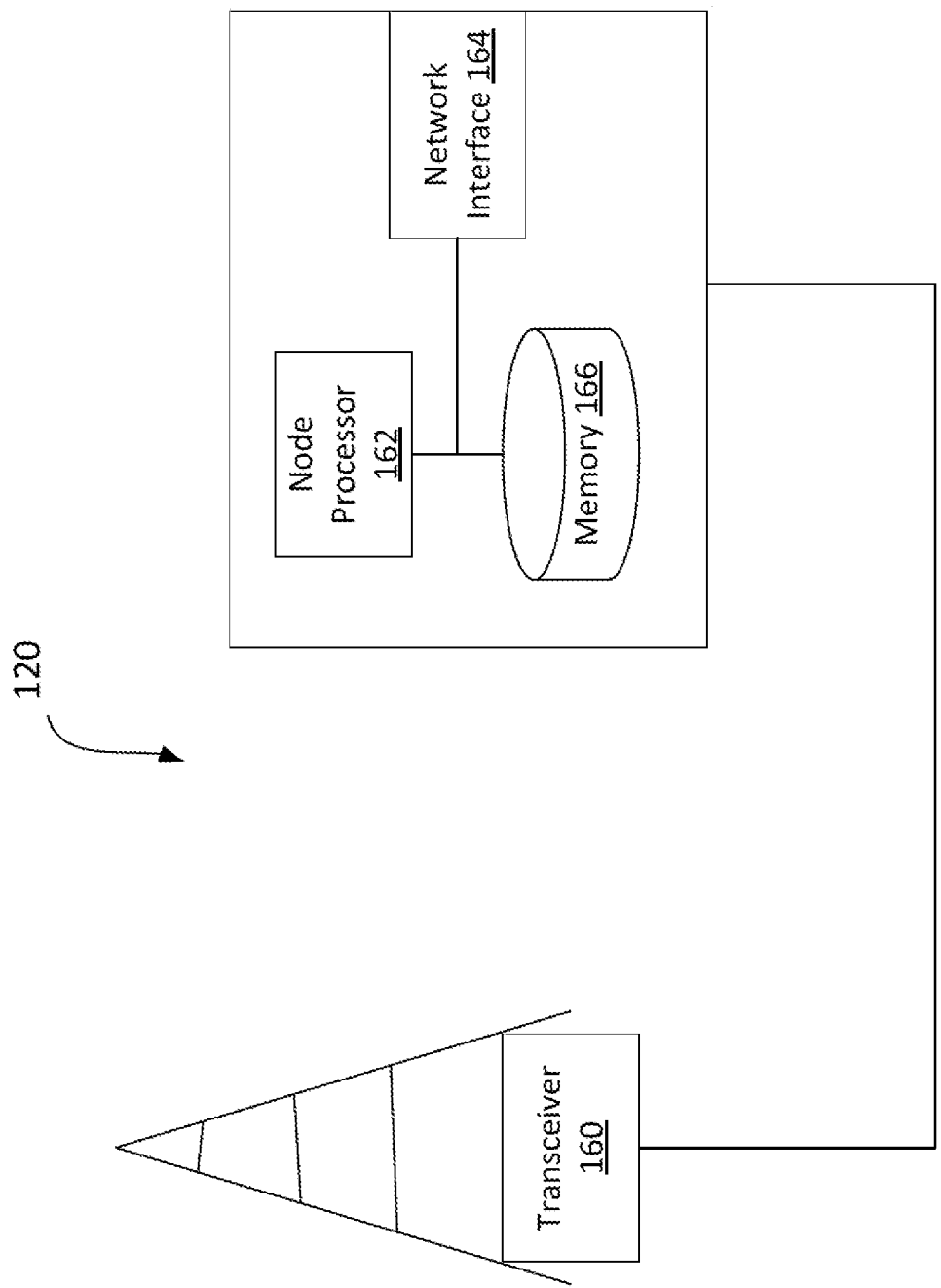
FIG. 5 illustrates a schematic diagram of a network node, according to an embodiment.

FIG. 5 is a block diagram of an exemplary radio access node or network node 120, in accordance with certain embodiments.

Radio access node or network node 120 may include one or more of a transceiver 160, processor 162, memory 166, and network interface 164. In some embodiments, the transceiver 160 facilitates transmitting wireless signals to and receiving wireless signals from wireless device 110 (e.g., via an antenna), the processor 162 executes instructions to provide some or all of the functionality described above as being provided by a radio access node 120, the memory 166 stores the instructions for execution by the processor 162, and the network interface 164 communicates signals to backend network components, such as a gateway, switch, router, Internet, Public Switched Telephone Network (PSTN), core network nodes or radio network controllers, etc.

The processor 162 may include any suitable combination of hardware and software implemented in one or more modules to execute instructions and manipulate data to perform some or all of the described functions of radio access node 120, such as those described above. In some embodiments, the processor 162 may include, for example, one or more computers, one or more central processing units (CPUs), one or more microprocessors, one or more applications, one or more application specific integrated circuits (ASICs), one or more field programmable gate arrays (FPGAs) and/or other logic.

The memory 166 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 164 is communicatively coupled to the processor 162 and may refer to any suitable device operable to receive input for radio access node 120, send output from radio access node 120, perform suitable processing of the input or output or both, communicate to other devices, or any combination of the preceding. The network interface 164 may include appropriate hardware (e.g., port, modem, network interface card, etc.) and software, including protocol conversion and data processing capabilities, to communicate through a network.

Other embodiments of radio access node or network node 120 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 4-5 may be included in other network nodes (such as core network node 130). Other network nodes may optionally include or not include a wireless interface (such as the transceiver described in FIGS. 4-5).

Figure 6:
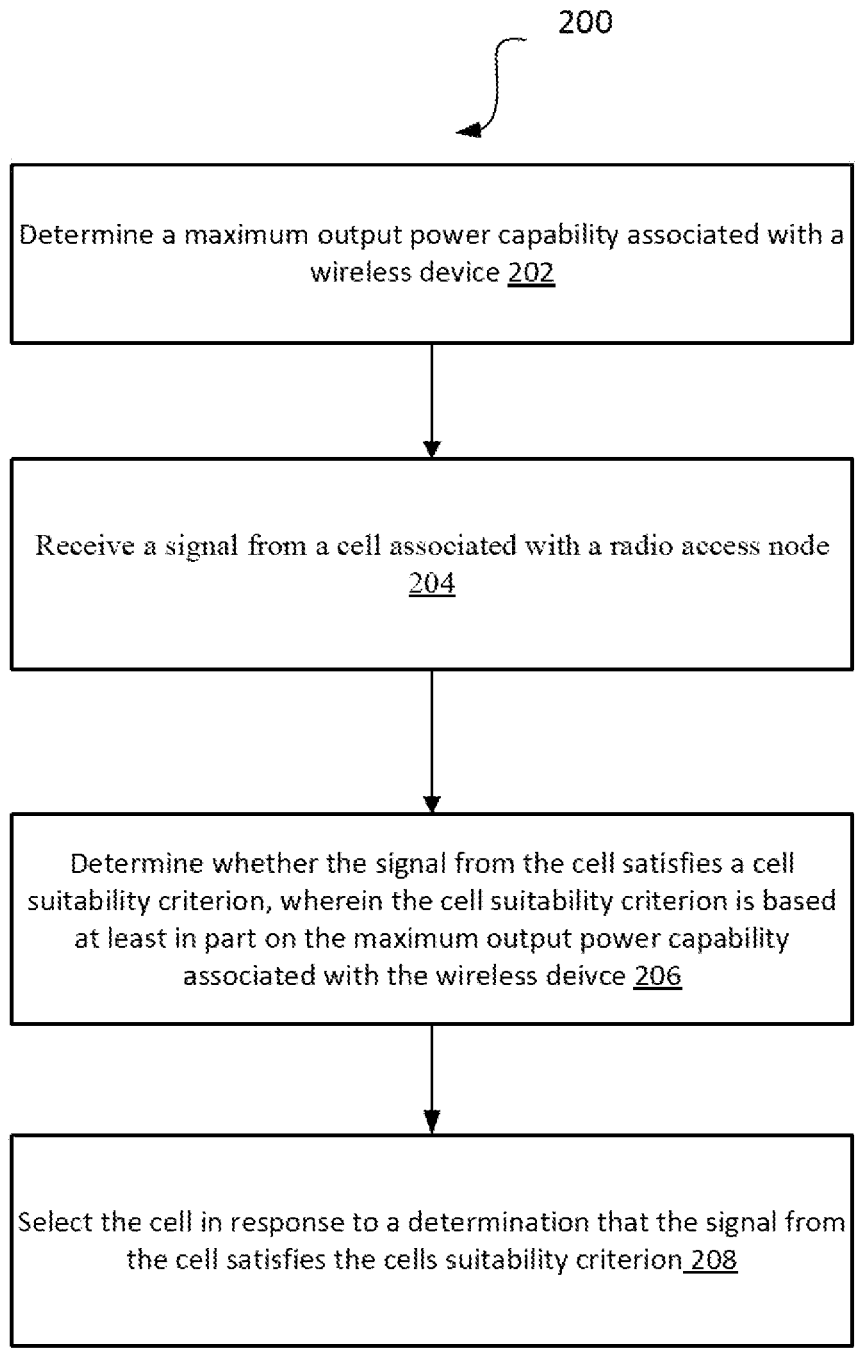
FIG. 6 is a flow chart of a method for use in a wireless device, according to an embodiment.

FIG. 6 below illustrates an example of a method 200 that may be performed by a wireless device 110, in accordance with certain embodiments of the present disclosure. First, the method determines a maximum output power capability associated with the wireless device (block 202). The maximum output power capability may be determined in any other suitable way. As an example, the wireless device may be configured with one or more parameters related to maximum output power, and the method may determine the maximum output power capability based on the settings of the one or more parameters. In certain embodiments, the wireless device may belong to a power class and the maximum output power capability may refer to the power class.

Second, the method receives a signal from a cell associated with a radio access node (block 204). Third, the method determines whether the signal from the cell satisfies a cell suitability criterion, wherein the cell suitability criterion is based at least in part on the maximum output power capability associated with the wireless device (block 206). That is, the cell suitability criterion may be non-linear depending on the maximum output power capability of the wireless device. In certain embodiments, the cell suitability criterion is satisfied if the signal received form the radio access node meets or exceeds a threshold. For example, the cell suitability criterion is satisfied if the received signal meets or exceeds a threshold for RSSI, signal level estimate, quality estimate, C/I, SNR, SINR, and/or other suitable threshold.

In certain embodiments, the cell suitability criterion may comprise a baseline cell suitability criterion plus a power class specific shift that depends on the maximum output power capability of the wireless device. The cell suitability criterion (e.g., baseline criterion and power class specific shift) may be determined in any suitable manner, such as according to one or more pre-defined rules, one or more pre-defined parameters, and/or one or more network configured parameters.

As an example, the wireless device may belong to either a first power class (if the wireless device has a higher maximum output power capability) or a second power class (if the wireless device has a lower maximum output power capability). The first power class may be associated with a first power class specific shift value, and the second power class may be associated with a second power class specific shift value. The first and second power class specific shift values may be configured to allow wireless devices in the first power class to select a cell during coverage conditions that wireless devices in the second power class would not select the cell, such as coverage conditions toward the edge of the cell. This may reduce the number of blind repetitions in the network because wireless devices with lower maximum output power capability would not satisfy the cell suitability criterion in coverage conditions that would otherwise require them to send repetitive transmissions. For simplicity, the preceding example has described two power classes, however, any suitable number of power classes can be used.

Fourth, the method selects the cell in response to a determination that the signal from the cell satisfies the cell suitability criterion (block 208). Selecting the cell may refer to camping on the cell or communicating with the cell in order to connect a call, data session, etc. If, on the other hand, a determination is made that the cell suitability criterion is not met, the method may search for another cell that satisfies the cell suitability criterion.

Figure 7:
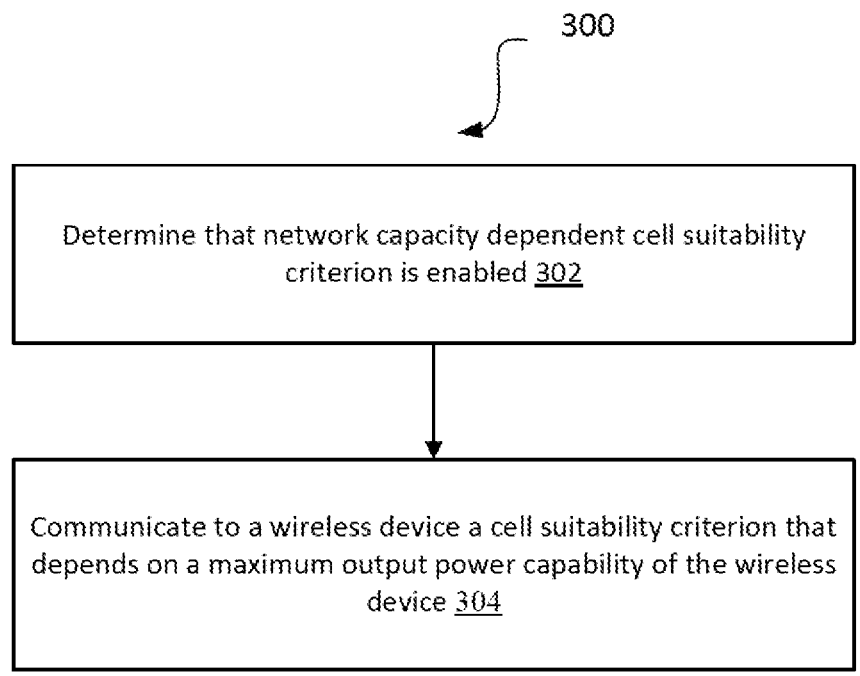
FIG. 7 is a flow chart of a method for use in a network node, according to an embodiment.

FIG. 7 below illustrates an example of a method 300 in a network node, such as radio access node 120. In certain embodiments, the method comprises determining that network capacity dependent cell suitability criterion is enabled (block 302) and, in response, communicating to a wireless device a cell suitability criterion that depends on a maximum output power capability of the wireless device (block 304). For example, the method may determine that network capacity dependent cell suitability criterion is enabled if one or more pre-defined rules and/or one or more pre-defined parameters have been configured that (1) expressly enable the criterion (e.g., by configuring an on/off setting), or (2) implicitly enable the criterion (e.g., by configuring rules or parameters that associate the cell suitability criterion with the maximum output power capability of the wireless device). Similarly, the method can determine the particular cell suitability criterion to communicate according to one or more pre-defined rules and/or one or more pre-defined parameters, for example. The cell suitability criterion may be communicated in any suitable manner. As one example, the method broadcasts a plurality of cell suitability criterion for a plurality of power classes, and each wireless device may determine the cell suitability criterion for its respective power class. As another example, a wireless device may communicate its power class information to the network node and, in response, the network node may send a message to the wireless device indicating cell suitability criterion for that power class.

Figure 8:
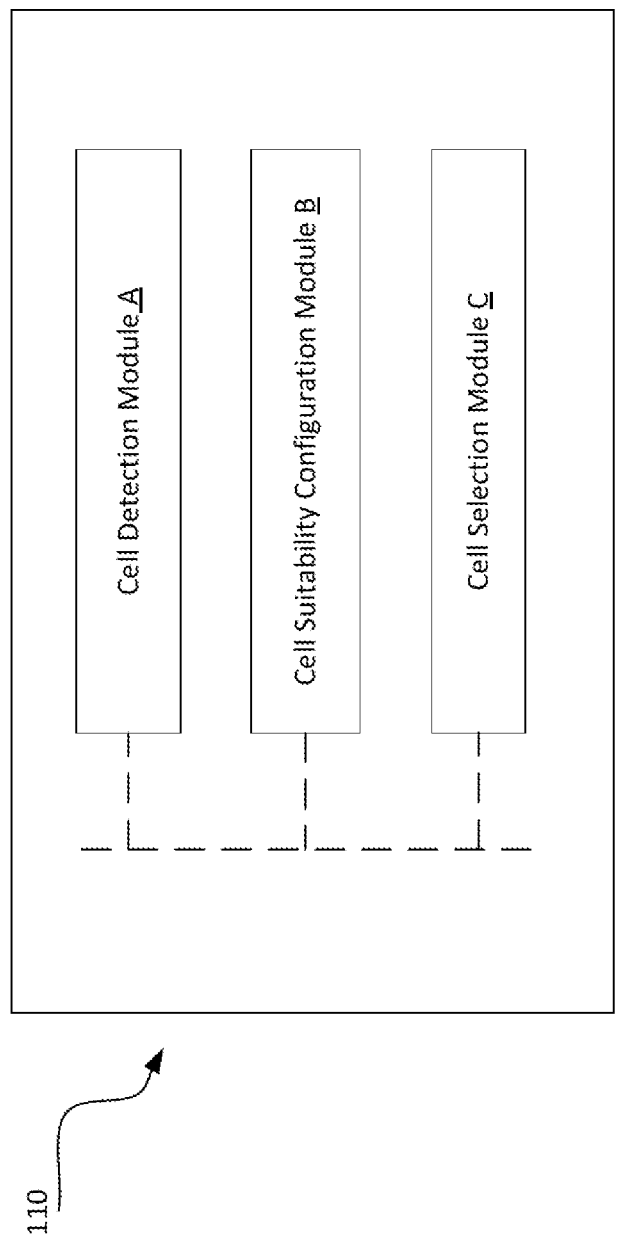
FIG. 8 is a block diagram of a wireless device configured with modules, according to an embodiment.

FIG. 8 below illustrates examples of modules that may be included in wireless device 110. In certain embodiments, the modules perform the method described with respect to FIG. 6. As an example, cell detection module (A) may receive a signal from a cell associated with a radio access node. Cell suitability configuration module (B) may determine suitability criterion that is based at least in part on the maximum output power capability associated with the wireless device. For example, the criterion may be determined based on one or more pre-defined rules, one or more pre-defined parameters, and/or one or more network configured parameters. Cell selection module (C) selects the cell (e.g., for camping on the cell or communicating a call or session with the cell) in response to a determination that the cell suitability criterion has been satisfied (e.g., the signal received by module (A) satisfies RSSI, signal level estimate, quality estimate, C/I, SNR, SINR, and/or other requirement of the cell suitability criterion determined by module (B)). In certain embodiments, the modules are implemented using one or more processors discussed with respect to FIG. 4. The modules may be integrated or separated in any manner suitable for performing the described functionality.

Figure 9:
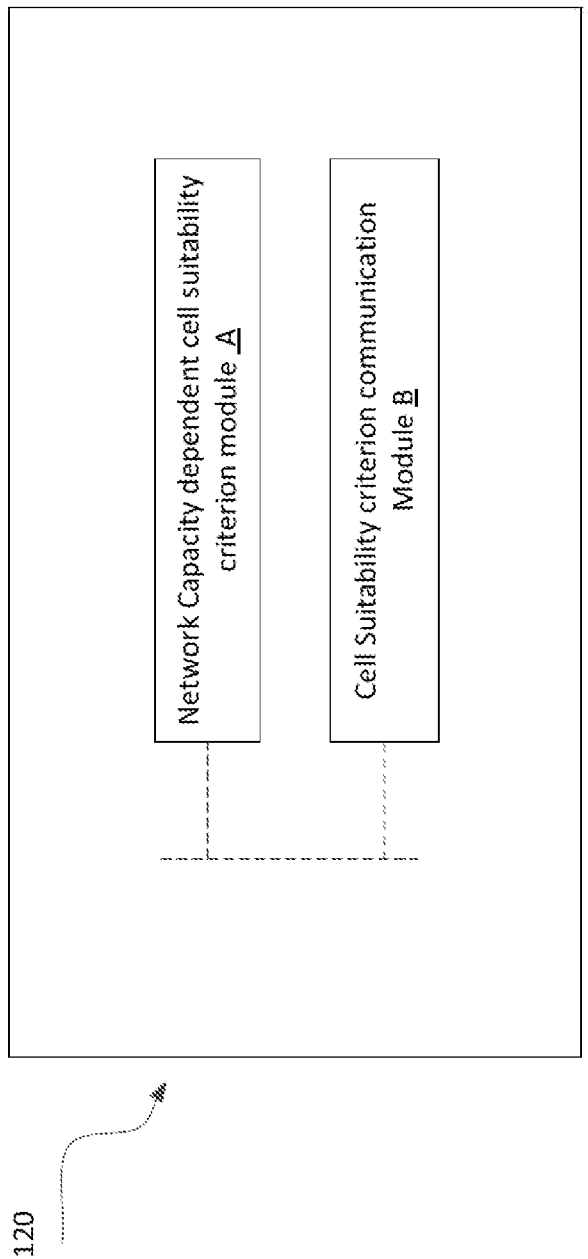
FIG. 9 is a block diagram of a network node, such as a radio access node, configured with modules, according to an embodiment.

FIG. 9 below illustrates examples of modules that may be included radio access node 120. In certain embodiments, the modules perform the method described with respect to FIG. 7. For example, network capacity dependent cell suitability module (A) may determine whether network capacity dependent cell suitability is enabled and, if so, may determine cell suitability criterion (e.g., based on pre-defined rules or pre-defined parameters). Cell suitability criterion communication module (B) may communicate the cell suitability criterion to one or more wireless devices. In certain embodiments, the modules are implemented using one or more processors discussed with respect to FIG. 5. The modules may be integrated or separated in any manner suitable for performing the described functionality.

Figure 10:
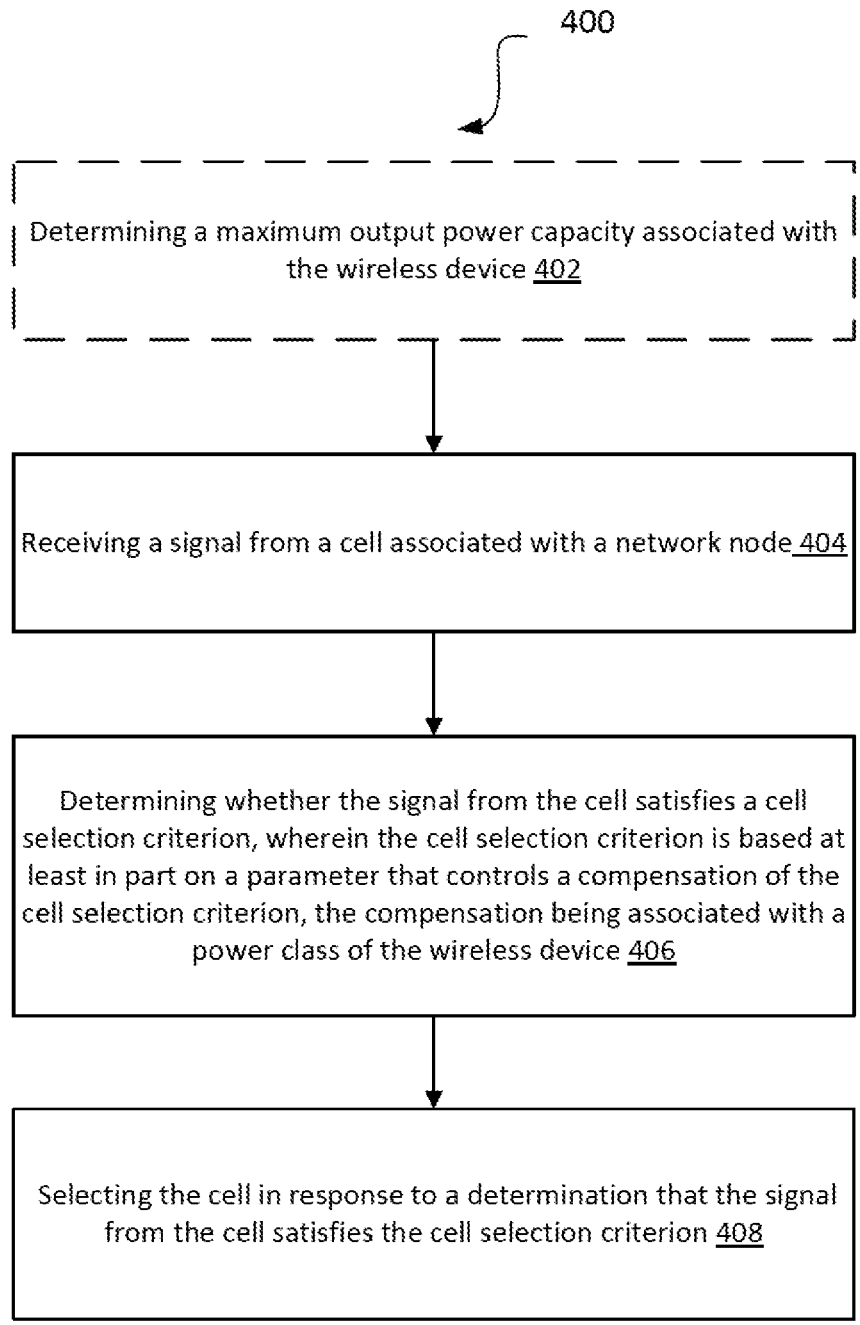
FIG. 10 is a flow chart of a method for selecting a cell by a wireless device in a wireless communication network, according to an embodiment.

FIG. 10 illustrates a flow chart of a method 400 for selecting a cell in a wireless communication, according to another embodiment. The method 400 can be carried out by the wireless device 110a or 110b, for example.

Method 400 comprises receiving a signal from a cell associated with a network node (block 404).

Method 400 comprises determining whether the signal from the cell satisfies a cell selection criterion, wherein the cell selection criterion is based at least in part on a parameter that controls a compensation to the cell selection criterion, the compensation being associated with a power class of the wireless device (block 406).

Method 400 also comprises selecting the cell in response to a determination that the signal from the cell satisfies the cell selection criterion (block 408).

Method 400 also comprises an optional step of determining a maximum output power capability associated with the wireless device (block 402).

In some embodiments, the received signal is a reference signal.

In some embodiments, the wireless device measures a received power of the reference signal when determining if the signal satisfies the cell selection criterion.

In some embodiments, the parameter that controls the compensation associated with the power class of the wireless device is received in a system information block (SIB).

In some embodiments, the parameter is an offset value that shifts the compensation to either allow the wireless device to access the cell or deny the wireless device to access the cell.

In some embodiments, the compensation, referred to as Pcompensation, comprises: Pcompensation=max(P-max−($P_{PowerClass}$−LPC-Offset), 0)

where P-max is the maximum uplink transmission power in a cell, $P_{PowerClass}$ is the maximum RF output power of the wireless device according to its power class and LCP-offset is the offset value or parameter.

In some embodiments, the parameter is provided by a function of a maximum allowed UE power and an output power of the wireless device, see for example equation 4.

In some embodiments, the function is a linear function.

In some embodiments, the linear function is further dependent on the power class of the wireless device.

In some embodiments, the method 400 determines a maximum output power capability associated with the wireless device.

In some embodiments, the cell selection criterion is further based at least in part on the maximum output power capability associated with the wireless device.

It should be noted that the method 400 may be performed by the modules of a wireless device 110, as shown in FIG. 8, for example. The cell detection module A is configured to receive a signal from a cell associated with a network node. The Cell Suitability Configuration module B is configured to determine if the received signal satisfies a cell selection criterion, wherein the cell selection criterion is based at least in part on a parameter that controls a compensation to the cell selection criterion, the compensation being associated with a power class of the wireless device. The cell selection module C is configured to select the cell in response to a determination that the signal from the cell satisfies the cell selection criterion.

The method 400 can be also performed by the processor 152 in combination with the memory 154 of FIG. 4.

Figure 11:
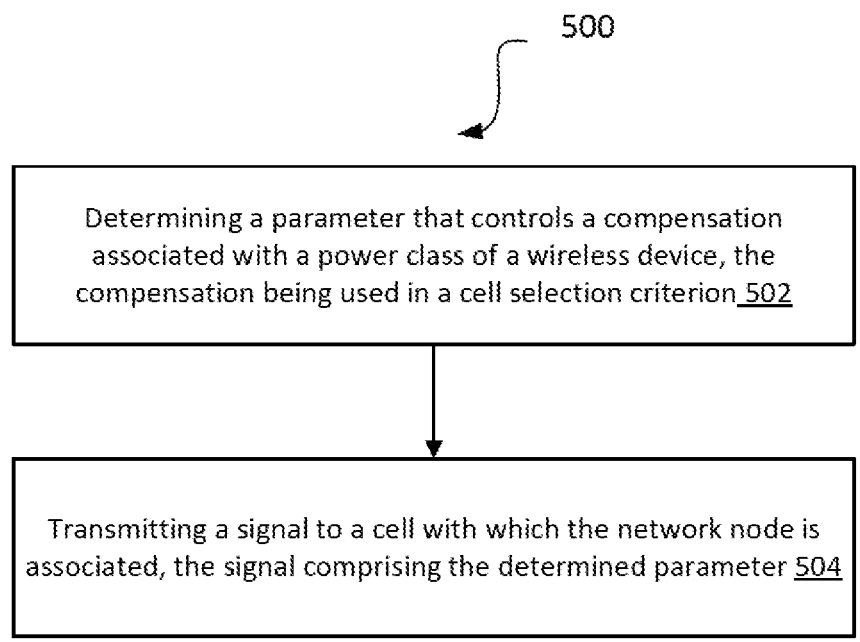
FIG. 11 is a flow chart of a method for controlling cell access in a wireless communication network, according to an embodiment.

Turning to FIG. 11, a flow chart illustrating a method 500 for controlling cell access in a wireless communication is described, according to another embodiment. The method 500 can be carried out by a network node or a radio access node 120, for example.

Method 500 comprises determining a parameter that controls a compensation to a cell selection criterion, the compensation being associated with a power class of a wireless device (block 502).

Method 500 comprises transmitting a signal to a cell with which the network node is associated, the signal comprising the determined parameter (block 504).

In some embodiments, the network node or radio access node sends a reference signal.

In some embodiments, the signal comprises a system block information (SIB) which carries the determined parameter.

In some embodiments, the signal comprises additional parameters related to the cell selection criterion.

In some embodiments, the network node determines the parameter based on a trade-off between coverage enhancements and an amount of network resources that the coverage enhancements require.

In some embodiments, the parameter is an offset value that shifts the cell selection criterion to either allow the wireless device to access the cell or deny the wireless device to access the cell.

In some embodiments, the compensation is referred to as Pcompensation and comprises: Pcompensation=max(P-max−($P_{PowerClass}$−LPC-Offset), 0)

where P-max is the maximum uplink transmission power in a cell, $P_{PowerClass}$ is the maximum Radio Frequency (RF) output power of the wireless device according to its power class and LCP-offset is the offset value/parameter.

In some embodiments, the parameter comprises a function of a maximum allowed UE power and an output power of the wireless device.

In some embodiments, the function is a linear function.

In some embodiments, the linear function is further dependent on the power class of the wireless device.

In some embodiments, the cell selection criterion is further based at least in part on a maximum output power capability associated with the wireless device.

In some embodiments, the network node receives a connection request for establishing a connection with the cell in response to a determination that the signal from the cell satisfies the cell selection criterion.

It should be noted that the method 500 can be implemented in the modules of a wireless device 110 as illustrated in FIG. 9, for example. The network capacity dependent cell suitability criterion module A is configured to determine a parameter that controls a compensation to a cell selection criterion, the compensation being associated with a power class of a wireless device. The Cell suitability criterion communication module B is configured to transmit a signal to a cell with which the network node is associated, the signal comprising the determined parameter.

The method 500 can be also performed by the processor 162 in combination with the memory 166 of FIG. 5.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (which then forms a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Example Embodiments

1. A method for use in a wireless device, the method comprising:
receiving a signal from a cell associated with a radio access node; and
determining whether the signal from the cell satisfies a cell suitability criterion, wherein the cell suitability criterion is based at least in part on a maximum output power capability associated with the wireless device.

2. The example method of embodiment 1, further comprising determining the cell suitability criterion based on one or more network configured parameters received from a network node, one or more pre-defined rules, and/or one or more pre-defined parameters.

3. The example method of embodiment 1, further comprising selecting the cell in response to a determination that the signal from the cell satisfies the cell suitability criterion.

4. The example method of embodiment 3, wherein to satisfy the cell suitability criterion, the received signal meets or exceeds a threshold for at least one of: RSSI, signal level estimate, quality estimate, C/I, SNR, and SINR.

5. The example method of embodiment 1, wherein the cell suitability criterion comprises a baseline cell suitability criterion plus a power class specific shift that depends on the maximum output power capability of the wireless device.

6. A method for use in a network node, the method comprising:
determining that network capacity dependent cell suitability criterion is enabled; and
communicating, to a wireless device, a cell suitability criterion that depends on a maximum output power capability of the wireless device, the cell suitability criterion communicated when the network capacity dependent cell suitability criterion is enabled.

7. The example method of embodiment 6, wherein the cell suitability criterion indicates a threshold for at least one of: RSSI, signal level estimate, quality estimate, C/I, SNR, and SINR.

8. The example method of embodiment 6, further comprising determining the cell suitability criterion based on one or more pre-defined rules and/or one or more pre-defined parameters.

9. The example method of embodiment 6, wherein the cell suitability criterion comprises a baseline cell suitability criterion plus a power class specific shift that depends on the maximum output power capability of the wireless device.

10. The example method of embodiment 6, wherein the cell suitability criterion is communicated via broadcast.

11. The example method of embodiment 6, wherein the cell suitability criterion is communicated in a message directed to the wireless device in response to receiving an indication of the maximum output power capability from the wireless device.

12. A wireless device, comprising:
a non-transitory computer readable medium; and
a processor, the processor configured to:
receiving a signal from a cell associated with a radio access node; and
determine whether the signal from the cell satisfies a cell suitability criterion, wherein the cell suitability criterion is based at least in part on a maximum output power capability associated with the wireless device.

13. The wireless device of example embodiment 12, wherein the processor is further configured to perform any one or more of the steps of example embodiments 1-5.

14. A network node, comprising:
a non-transitory computer readable medium; and
a processor, the processor configured to:
determine that network capacity dependent cell suitability criterion is enabled; and communicate to a wireless device, a cell suitability criterion that depends on a maximum output power capability of the wireless device, the cell suitability criterion communicated when the network capacity dependent cell suitability criterion is enabled.

15. The network node of example embodiment 13, wherein the processor is further configured to perform any one or more of the steps of example embodiments 6-11.

The preceding examples are non-limiting and may be combined in any suitable manner.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A method for selecting a cell by a wireless device in a wireless communication network, the method comprising:
receiving a signal from a cell associated with a network node;
determining whether the signal from the cell satisfies a cell selection criterion, wherein the cell selection criterion is based at least in part on a parameter that changes a compensation to the cell selection criterion, the compensation being associated with a power class of the wireless device, wherein the compensation is referred to as Pcompensation and comprises:

$$\text{Pcompensation} = \max(\text{P-max} - (P_{PowerClass} - \text{LPC-Offset}), 0)$$

where P-max is a maximum uplink transmission power in a cell, $P_{PowerClass}$ is a maximum Radio Frequency (RF) output power of the wireless device according to a power class of the wireless device and LPC-Offset (Low Power Class-Offset) is the parameter that changes the compensation; and
selecting the cell in response to a determination that the signal from the cell satisfies the cell selection criterion.

2. The method of claim 1, wherein the parameter that controls the compensation is received in a system information block (SIB).

3. The method of claim 1, wherein the parameter is an offset value that shifts the cell selection criterion to either allow the wireless device to access the cell or deny the wireless device to access the cell.

4. The method of claim 1, wherein the parameter comprises a function of a maximum allowed UE power and an output power of the wireless device.

5. The method of claim 1, wherein the cell selection criterion is further based at least in part on a maximum output power capability associated with the wireless device.

6. A method for controlling cell access in a wireless communication network, the method comprising:
determining a parameter that changes a compensation to a cell selection criterion, the compensation being associated with a power class of a wireless device
wherein the compensation is referred to as Pcompensation and comprises:

$$\text{Pcompensation} = \max(\text{P-max} - (P_{PowerClass} - \text{LPC-Offset}), 0)$$

where P-max is a maximum uplink transmission power in a cell, $P_{PowerClass}$ is a maximum Radio Frequency (RF) output power of the wireless device according to a power class of the wireless device and LPC-Offset (Low Power Class-Offset) is the parameter that changes the compensation; and
transmitting a signal to a cell with which the network node is associated, the signal comprising the determined parameter.

7. The method of claim 6, wherein the signal comprises a system block information (SIB), which carries the determined parameter.

8. The method of claim 6, wherein the parameter is determined based on a trade-off between coverage enhancements and an amount of network resources that the coverage enhancements require.

9. The method of claim 6, wherein the parameter is an offset value that shifts the cell selection criterion to either allow the wireless device to access the cell or deny the wireless device to access the cell.

10. The method of claim 6, wherein the parameter comprises a function of a maximum allowed UE power and an output power of the wireless device.

11. A wireless device for selecting a cell in a wireless communication network, the wireless device comprising:
a processor and a memory connected thereto, wherein the memory comprises instructions that, when executed, cause the processor to:
receive a signal from a cell associated with a network node;
determine whether the signal from the cell satisfies a cell selection criterion, wherein the cell selection criterion is based at least in part on a parameter that changes a compensation to the cell selection criterion, the compensation being associated with a power class of the wireless device; and wherein the compensation is referred to as Pcompensation and comprises:

Pcompensation=max(P-max−($P_{PowerClass}$−LPC-Offset),0)

where P-max is a maximum uplink transmission power in a cell, $P_{PowerClass}$ is a maximum Radio Frequency (RF) output power of the wireless device according to a power class of the wireless device and LPC-Offset (Low Power Class-Offset) is the parameter that changes the compensation; and select the cell in response to a determination that the signal from the cell satisfies the cell selection criterion.

12. The wireless device of claim 11, wherein the processor is further configured to receive a system information block (SIB) that carries the parameter that controls the compensation.

13. The wireless device of claim 11, wherein the parameter is an offset value that shifts the cell selection criterion to either allow the wireless device to access the cell or deny the wireless device to access the cell.

14. The wireless device of claim 11, wherein the processor is further configured to determine a maximum output power capability associated with the wireless device.

15. A network node for controlling cell access in a wireless communication network, comprising:

a processor and a memory connected thereto, the memory comprising instructions that, when executed, cause the processor to:

determine a parameter that changes a compensation to a cell selection criterion, the compensation being associated with a power class of a wireless device wherein the compensation is referred to as Pcompensation and comprises:

Pcompensation=max(P-max−($P_{PowerClass}$−LPC-Offset),0)

where P-max is a maximum uplink transmission power in a cell, $P_{PowerClass}$ is a maximum Radio Frequency (RF) output power of the wireless device according to a power class of the wireless device and LPC-Offset (Low Power Class-Offset) is the parameter that changes the parameter; and transmit a signal to a cell with which the network node is associated, the signal comprising the determined parameter.

16. The network node of claim 15, wherein the signal comprises a system block information (SIB) which provides the determined parameter.

17. The network node of claim 15, wherein the processor is configured to determine the parameter based on a trade-off between coverage enhancements and an amount of network resources that the coverage enhancements require.

18. The network node of claim 15, wherein the parameter is an offset value that shifts the cell selection criterion to either allow the wireless device to access the cell or deny the wireless device to access the cell.

19. The network node of claim 15, wherein the parameter comprises a function of a maximum allowed UE power and an output power of the wireless device.

20. The network node of claim 15, wherein the cell selection criterion is further based at least in part on a maximum output power capability associated with the wireless device.

* * * * *

UNITED STATES PATENT AND TRADEMARK OFFICE
CERTIFICATE OF CORRECTION

PATENT NO.        : 11,166,229 B2
APPLICATION NO.   : 16/338143
DATED             : November 2, 2021
INVENTOR(S)       : Sundberg et al.

It is certified that error appears in the above-identified patent and that said Letters Patent is hereby corrected as shown below:

In the Specification

In Column 1, Line 52, delete "("RS SI"));" and insert -- ("RSSI")); --, therefor.

In Column 2, Line 5, delete "(MTC)" and insert -- (MTCs) --, therefor.

In Column 2, Line 7, delete "communication (GSM)," and insert -- (GSM) communication, --, therefor.

In Column 4, Line 26, delete "need" and insert -- needs --, therefor.

In Column 5, Line 4, delete "≤134 dB:" and insert -- ≤134 dB: --, therefor.

In Column 5, Lines 47-50, delete "where:Srxlev=$Q_{rxlevmeas}Q_{rxlevmin}$Pcompensation-Qoffset$_{temp}$" and insert -- where:Srxlev= $Q_{rxlevmeas}$ - $Q_{rxlevmin}$ - Pcompensation-Qoffset$_{temp}$ --, therefor.

In Column 6, in Equation, Lines 3-5, delete "$$Pcompensation=max(P\text{-}max\text{-}P_{powerClass},0)-(min(additionalPmax,P_{powerClass})-min(P\text{-}max,P_{powerClass})$$" and insert -- $$Pcompensation=max(P\text{-}max\text{-}P_{powerClass},0)-(min(additionalPmax,P_{powerClass})-min(P\text{-}max,P_{powerClass}))$$ --, therefor.

In Column 6, Line 10, delete "$P_{powerclass}$is" and insert -- $P_{powerless}$ is --, therefor.

In Column 8, Line 4, delete "communication (M2M)," and insert -- (M2M) communication, --, therefor.

In Column 8, Line 6, delete "equipped" and insert -- equipment --, therefor.

Signed and Sealed this
Twelfth Day of July, 2022

Katherine Kelly Vidal
*Director of the United States Patent and Trademark Office*

CERTIFICATE OF CORRECTION (continued)
U.S. Pat. No. 11,166,229 B2

In Column 9, Line 26, delete "communication (GSM)," and insert -- (GSM) communication, --, therefor.

In Column 9, Line 59, delete "and/or or" and insert -- and/or --, therefor.

In Column 10, Line 50, delete "and/or or" and insert -- and/or --, therefor.

In Column 11, Line 37, delete "form" and insert -- from --, therefor.

In Column 12, Line 63, delete "included radio" and insert -- included in radio --, therefor.

In Column 15, Line 21, delete "skill" and insert -- skilled --, therefor.

In the Claims

In Column 18, Line 26, in Claim 6, delete "device" and insert -- device, --, therefor.

In Column 18, Line 67, in Claim 11, delete "device; and" and insert -- device, --, therefor.

In Column 19, Line 33, in Claim 15, delete "device" and insert -- device, --, therefor.